(12) United States Patent
Hamoir (10) Patent No.: US 8,835,824 B2
(45) Date of Patent: Sep. 16, 2014

(54) METHOD AND SYSTEM FOR ACTIVE IMAGING WITH A LARGE FIELD

(75) Inventor: Dominique Hamoir, Toulouse (FR)

(73) Assignee: ONERA (Office National d'Etudes et de Recherches Aerospatiales), Chatillon (FR)

( * ) Notice: Subject to any disclaimer, the term of this patent is extended or adjusted under 35 U.S.C. 154(b) by 418 days.

(21) Appl. No.: 13/264,356

(22) PCT Filed: Apr. 13, 2010

(86) PCT No.: PCT/FR2010/050717
§ 371 (c)(1),
(2), (4) Date: Dec. 14, 2011

(87) PCT Pub. No.: WO2010/119225
PCT Pub. Date: Oct. 21, 2010

(65) Prior Publication Data
US 2012/0112038 A1    May 10, 2012

(30) Foreign Application Priority Data
Apr. 14, 2009  (FR) .................................... 09 52418

(51) Int. Cl.
*H01L 27/00*  (2006.01)
*G01C 3/08*   (2006.01)
*H04N 5/225*  (2006.01)

(52) U.S. Cl.
CPC ............................. *H04N 5/2256* (2013.01)
USPC ........................................ 250/208.1; 356/5.04

(58) Field of Classification Search
USPC .............................. 356/5.02, 5.04; 250/208.1
See application file for complete search history.

(56) References Cited

U.S. PATENT DOCUMENTS 4,226,529 A * 10/1980 French ......................... 356/5.04

FOREIGN PATENT DOCUMENTS

| DE | 40 26 956 A1 | 3/1992 |
|---|---|---|
| EP | 1 978 725 A2 | 10/2008 |
| FR | 2 706 717 A1 | 12/1994 |
| FR | 2 863 727 A1 | 6/2005 |
| WO | WO 2004/071074 A1 | 8/2004 |
| WO | WO 2006/085834 A1 | 8/2006 |

OTHER PUBLICATIONS

English Translation of Written Opinion completed Sep. 6, 2010 and mailed Sep. 13, 2010 from corresponding International Application No. PCT/FR2010/050717, filed Apr. 13, 2010 (5 pages).

(Continued)

*Primary Examiner* — Thanh Luu
(74) *Attorney, Agent, or Firm* — Klein, O'Neill & Singh, LLP (57) ABSTRACT

The present disclosure relates to an imaging system comprising an impulsion light source for an input light beam oriented toward an observed area and an optoelectronic sensor having a photosensitive surface with a visibility capable of substantially covering the observed area. An impulsion of the incident light beam is backscattered by only by a portion of the observed area into a backscattered spot on the photosensitive surface. A deflection device deflects the impulsions of the incident light beam onto the respective portions of the observed area. A device acquires the thumbnail images corresponding to the backscattered spots resulting in impulsions of the incident light beam. The system combines said thumbnail images to produce an image having a sufficiently high signal-to-noise ratio for portions of interest of the observed area, a high spatial resolution, and a greater insensitivity to motion blurs.

20 Claims, 3 Drawing Sheets

(56) References Cited

OTHER PUBLICATIONS

International Search Report completed Sep. 6, 2010 and mailed Sep. 13, 2010 from corresponding International Application No. PCT/FR2010/050717, filed Apr. 13, 2010 (6 pages).
Written Opinion completed Sep. 6, 2010 and mailed Sep. 13, 2010 from corresponding International Application No. PCT/FR2010/050717, filed Apr. 13, 2010 (5 pages).
International Preliminary Examination Report completed Oct. 25, 2010 and mailed Jul. 25, 2011 from corresponding International Application No. PCT/FR2010/050717, filed Apr. 13, 2010 (14 pages).
English translation of the International Preliminary Examination Report completed Oct. 25, 2010 and mailed Jul. 25, 2011 from corresponding International Application No. PCT/FR2010/050717, filed Apr. 13, 2010 (3 pages).

* cited by examiner

FIG. 9

METHOD AND SYSTEM FOR ACTIVE IMAGING WITH A LARGE FIELD

CROSS-REFERENCE TO RELATED APPLICATIONS

This is a national phase application under 35 U.S.C. §371 of PCT Application No. PCT/FR2010/050717, filed Apr. 13, 2010, which claims the benefit of French application No. 09/52418 filed Apr. 14. 2009, the contents of each of which are expressly incorporated herein by reference.

FIELD OF ART

The present method. system and device relate to an imaging method and system using an incident light beam, such as a laser beam, emitted from a pulsed source, towards an observed area substantially covered by the view field of the photosensitive surface area of an optronic sensor.

BACKGROUND

In the state of the art, active imaging systems, also referred to as laser imaging systems, with a matrix sensor, also referred to as a matrix of detectors or "focal plane array", are essentially of three types. They all possess a pulsed source of incident light beam illuminating the observed area at each pulse of the incident beam.

A mono-pulse active imaging system (2D flash) with a video rate includes a light source, such as a low-rate solid-state laser, for example of the optical parametric oscillator OPO type. The observed area is illuminated and imaged at each pulse of the incident beam, typically at a rate of 10 Hz to 20 Hz. The images processed in this system are generally submitted to a time aliasing that is a time filtering representative of a deep space filtering.

This first system is limited by the emission mean power of low-rate solid-state lasers, that no proceeds any longer significantly. Such a limitation is all the stronger when the eye safety is required. This requires either the use of an optical parametric oscillator for converting the energy wavelength generally emitted at 1 μm into less dangerous wavelengths, generally ranging between 1.5 μm and 2 μm, or the use of sources directly emitting at the wavelength of 2 μm, less mature than sources emitting at the wavelength of 1 μm.

An active imaging system of the second type includes a pulsed light source showing a better compromise between the emission power on the one hand, and industrial constraints such as the cost, the energy consumption, the bulk and the mass of the source, on the other hand. The source in such a system emits at a higher rate, higher than 100 Hz. The source is for example, according to the applications, a laser diode, a fiber laser or a light emitting diode. This system often operates at a rate ranging between 1 kHz and 100 kHz so as to extract as much light power as possible from the source. The light energy emitted by a pulse being then relatively low, this system digitally cumulates the images associated with a series of pulses to form the final image to be presented to an operator or to an image processing device.

The second type system allows the use of a stronger light source than that used in the first type system. However, this second type system only gains in signal-to-noise ratio or in useful illuminated surface according to the square root of the number of cumulated pulses if the image is read at each pulse of the incident beam before the digital accumulation of associated images. According to a global performance criterion represented by the product of the range at the observed area by the useful illuminated diameter of the observed area, the achieved operation gain is minimum. Moreover, the flow rates of the data to be processed for the reading of the optronic sensor as well as for pre-processing and accumulating images are excessive. Finally, the effective exposure time, corresponding to the total duration needed for forming an image with a sufficient signal-to-noise ratio, is very significantly longer than for the first type system, being a major difficulty in some applications.

The third type relates to an active imaging system having a fast shutter device independent from the matrix of photodetectors, for example a light intensification device. The accumulation of images is analogically achieved by accumulating charges in the photodetectors of the sensor during a series of pulses from the incident beam. The charges accumulated in the sensor are thus only read once per series of pulses through opening and shutting the field of the receiving path upstream the sensor, for example by means of an intensifier.

The analog accumulation system according to the third type gains in signal-to-noise ratio or in useful illuminated surface depending on the mean emission power of the light source. According to the above-defined global performance criterion, the operational gain varies according to the square root of the light emission power. Additionally, the reading rate of the sensor and the flow rate of the data to be processed remain identical to those for a first type system. Nevertheless, such a technique is hard to adapt to all optronic sensors, in particular to avalanche photodetector sensors being particularly promising. In addition, the third type system leads like the second type system to a long effective exposure time, making the system more sensitive to fuzziness resulting from the motion of objects in the observed area or of the system as such, or resulting from strong atmospheric turbulences, than the active mono-pulse imaging, without any possibility of an efficient alignment through processing of images in the case of a third type system. Under impaired atmospheric or submarine conditions generating a high scatter of the incident beam, the second and third type systems also have a limited rate resulting from the to-and-fro propagation time of the light between the system and the observed area.

None of these three types of imaging system can image simultaneously two objects in the observed area should they be separated from an angular distance higher than the divergence of the incident beam. Moreover, the performance of these three types of imaging system is reduced when two objects are to be simultaneously imaged in the observed area if they are separated by a depth distance bigger than the opening time of a time door for integrating the charges of the photodetectors in the sensor, as the space filtering through time aliasing becomes less efficient.

In these three types of imaging system, performance shows to be too limited for meeting some requirements. The available field on one single image remains very low compared to the surface of the areas to be monitored and compared to the fields offered by the visible or thermal passive imaging. The range is not sufficiently larger than that available in passive imaging under clear sky conditions. The second and third type systems are sensitive to fuzziness of the mobility of the system or of objects to be observed.

SUMMARY

The object of the present method, system and device is to overcome the drawbacks of the known imaging systems and more particularly to provide an imaging system with a signal-to-noise ratio sufficiently high for at least one part of interest in the observed area. including under impaired atmospheric conditions, a high spatial resolution and a higher insensitivity to mobility fuzziness.

Accordingly, an imaging method wherein an incident beam is emitted by a pulsed light source towards an observed area covered substantially by the view field of the photosensitive surface area of an optronic sensor, is characterized in that it includes backscattering a pulse of the incident beam only by a portion of the observed area forming a backscatter spot on the photosensitive surface area, deflecting pulses of the incident beam on respective portions of the observed area, and acquiring small-sized images corresponding to backscatter spots resulting from the emission of the pulses of the incident beam.

According to the present method, system and device, the incident beam has a section such that it only illuminates at each pulse a small portion of the observed area, although the observed area is within the view field of the optronic sensor. At constant range, the useful illuminated surface by the incident beam in a response time or a refresh time of the system, typically 20 milliseconds to about 1 second, is proportionally increased at the light power emitted by the source, and not only according to the square root of the power as for a imaging system of second type. Thus, the global performance criterion defined by the product of the range at the observed area by the useful illuminated diameter on the observed area is increased according to the square root of the emitted light power, and not only according to the fourth root thereof.

The rate of the read data to be processed remains reasonable, of the same order of magnitude as in an imaging system of first type that would have the same emission optical power.

Taking into consideration the illumination of a small portion of the observed area by a pulse of the incident beam, the problems of mobility fuzziness and backscattered signal on diffusing particles or on obstacles interposed between the imaging system and the observed area are overcome. The optronic sensor can include avalanche photodetectors fully compatible with the present method, system and device.

The imaging method according to the present method, system and device can be varied according to different modes, some of which are described herein.

Assuming (x, y, z) the axes of a three-dimension reference frame linked to an imaging system. (x, y) corresponding substantially to the conjugated plane of the plane of the sensor by the optical system of the imaging system and (z) corresponding substantially to the axis of sight of the imaging system. It should be noted that in the remainder, the distance (the dimension) z is equivalent to the time t according to the relationship $z=ct/2$, c being the speed of the light in the propagation medium.

The laser flash imaging obtained by the method of the present disclosure can be, more specifically, such that:
2D) the light energy $E(x, y)$ received by each pixel, during the integration time of the sensor, typically 1 to 1000 ns, in response to the emitted pulse is measured as a function of the mean dimensions x and y of the small volume of the space imaged by each pixel; the product of the measurement is a 2D planar image; or
3D) the distance $z(x, y)$ to a surface S producing a "return echo" is measured as a function of x and y, and in a preferred embodiment, the light energy $E(x, y, z)$ associated with this "return echo" is also measured as a function of x, y and z, the product of the measurement is a cloud of 3D points, the value of E being ideally allotted in attribute to each retained point of the return echo; or
4D) the instantaneous light power $P(x, y, z)$ received by each pixel of the sensor in response to the emitted pulse is measured as a function of x, y and z; the product of the measurement is a volume representation.

In more operational embodiments, the laser flash imaging obtained by the method of the present disclosure can be, more specifically, such that:
3D) the distance $zi(x, y)$ to the surface $Si$ producing the ith "return echo" is measured as a function of x and y, and in a preferred embodiment, the light energy $E(x, y, zi)$ associated with this "return echo" is also measured as a function of x, y and zi, with $0 \leq i \leq I$ and I generally ranging between 1 and 10 or sometimes 1 and 20; the product of the measurement is a cloud of 3D points, the value of E being ideally allotted in attribute to each point of the return echo;
4D) the instantaneous light power $P(x, y, zi)$ received by each pixel of the sensor in response to the emitted pulse is measured as a function of time and thus of z for a limited period of time T for each point x, y, zi corresponding to a "return echo"; the product of the measurement can be considered either as a partial volume representation, limited to the regions of the space having produced the retained "return echoes", or as a cloud of points allotted in recordings $P(z)$ in attribute.

In each of these modes, other physical attributes can be measured alone or as a complement, including attributes indicative of responses in polarization, in frequency, in fluorescence or Doppler effect of the imaged surfaces. The duration of each emitted pulse is most often of the order of 1 to 10 ns in the case of the 2D laser flash imaging, and of 1 ns in the case of the 3D or 4D laser flash imaging. The duration is of the order of the picosecond when the attributes relating to the fluorescence are to be accessed to. The pulse is modulated at a high frequency when the Doppler information is to be accessed to.

In an alternative embodiment, it is possible to cumulate pulses on a same small-sized image when the use conditions of the imaging system are for example such that the range is such that a signal-to-noise ratio would remain insufficient without such a combination. In such a case, the required number of pulses remains very substantially lower than the number of pulses that would have been required according to the state of the art for reaching the same signal-to-noise ratio.

In order to ensure illumination continuity between adjacent small-sized images in the final image to reproduce and fade the enhanced variations of light intensities at the edge of small-sized images, two acquired small-sized images corresponding to backscatter spots can be geometrically offset the one with respect to the other. The method can include a partial overlap of backscatter spots at least two to two, a partial overlap of the small-sized images at least two to two and a combination at least of two adjacent small-sized images. The combination at least of two adjacent small-sized images can include a radiometric alignment of said at least two adjacent small-sized images that will be understood in terms of intensity and quality of the signal received by the imaging system, i.e. as an electric signal and a digital count at the outlet of a sensor of the imaging system. Taking into consideration a high rate of the pulses of the incident beam, for example of the order of 10 kHz, the alignment of two adjacent small-sized images can only occur for example at least every 10 consecutive small-sized images, or every line or column of small-sized images of a matrix of photodetectors included in the sensor.

The method of the present disclosure can include integrating charges accumulated in the photosensitive surface area during at least the reception of each backscatter spot by the sensor, reading the accumulated charges corresponding only to the backscatter spot to make up a small-sized image, and an inactivity of the photosensitive surface area during at least the scatter of each pulse of the incident beam between the source and the observed area.

In another embodiment, in order to avoid detecting an interference backscatter of the incident beam. the method includes emitting consecutive pulses of the incident beam towards portions of the observed area that are not contiguous to produce small-sized images that are not contiguous on the photosensitive surface area. Thus, for example, the images of two distinct objects in the observed area can alternatively consist in a small-sized image of one of the objects, then a small-sized image of the other object. According to another example, the image of an object can alternatively consist in a small-sized image of a line or a column of a matrix of photodetectors included in the sensor, then a small-sized image of another line or column of the matrix not contiguous to the previous one. In this embodiment, the rate of pulses of the incident beam can be increased by receiving a backscatter spot resulting from the emission of a pulse of the incident beam and acquiring a small-sized image issued from the backscatter spot between the emissions of two consecutive pulses of the incident beam following said pulse of the incident beam.

The impact of the mobility fuzziness and distortions of an object in the observed area or of the imaging system as such is still more significantly faded if the emitted pulses of the incident beam are deflected towards portions of the observed area partially overlapping two to two and substantially following a spiral, and are backscattered into corresponding spots partially overlapping two to two and substantially following a spiral on the photosensitive surface area.

The angular agility of the light beam enables to illuminate from one pulse to the other, or from a series of pulses to the other, objects relatively spaced therebetween, optionally not illuminating the areas of the space located between these objects. Moreover, by means of the view field of the photosensitive surface area of the optronic sensor covering a significantly larger observed area than the portion illuminated by a pulse of the incident beam, objects relatively spaced therebetween, both angularly and in depth, remain in the angular view field of the focal plane of the sensor. In view of the available power supply, the method of the present disclosure allows to lead to polarimetric or multi-spectral active imaging. With this respect, the frequency and/or the size of small-sized images can be adapted to view conditions and objectives. Thus, small-sized images corresponding to a sub-area, such as an object, of the observed area can be acquired successively in a synchronous way with a frequency of incident beam pulses different from that for small-sized images of another sub-area, such as the context surrounding the object, of the observed area. The refreshing rates of the small-sized images corresponding to the different frequencies of pulses of the incident beam, or more generally the refreshing rates of the small-sized images of a sub-area from the observed area to the other, can be adapted in time as a function of the requirements. According to an alternative embodiment, two small-sized images covered by backscatter spots resulting from the emission of two pulses of the light beam, or more generally small-sized images of lines or columns of a matrix of photodetectors included in the sensor, can have different sizes. According to other alternative embodiments, a small-sized image can cover a substantially larger surface than the corresponding backscatter spot. According to another alternative embodiment, the sections of the incident beam or the energies emitted per pulse for two pulses can be different.

The present method, system and device thereby give the opportunity to access a reduced angular sector with significantly higher signal-to-noise ratios at a very large distance, being of interest in terms of compromise between the signal-to-noise ratio and a spatial resolution for applications for which the spatial resolution is limited by the diffraction i.e. by the maximum dimension of the receiving optics before the sensor. A better signal-to-noise ratio allows, in some extent, to compensate for the loss of spatial resolution.

The present method, system and device also provide an imaging system including a pulsed light source for emitting an incident beam oriented towards an observed area and an optronic sensor having a photosensitive surface area with a view field able to substantially cover the observed area. The system is characterized in that a pulse of the incident beam is able to be only backscattered by a portion of the observed area to form a backscatter spot on the photosensitive surface area, and in that it includes deflection means for deflecting pulses of the incident beam on respective portions of the observed area, and acquisition means for acquiring small-sized images able to correspond to backscatter spots resulting from the emission of pulses of the incident beam.

According to a first embodiment, the system can include means for integrating charges accumulated in the photosensitive surface area during at least the reception of each backscatter spot by the sensor, means for reading accumulated charges only corresponding to the backscatter spot to make up a small image, and means for maintaining inactive the photosensitive surface area during at least the scatter of each pulse of the incident beam between the source and the observed area.

According to a second embodiment, the system can include means for integrating charges accumulated in the photosensitive surface area between emissions of two consecutive pulses of the incident beam, so that the acquisition means are able to acquire a small-sized image issued from a backscatter spot resulting from an emission of a pulse of the incident beam preceding the two consecutive pulses of the incident beam.

The present method, system and device still relate to a computer program adapted to be implemented in an imaging system according to the present disclosure, said program including instructions, which, when the program is executed in said imaging system, control the steps in accordance with the method of the present disclosure.

BRIEF DESCRIPTION OF THE FIGURES

Other features and advantages of the present method, system and device will become more clearly apparent on reading the following description of several embodiments of the present method, system and device given by way of non-limiting examples and with reference to the corresponding appended drawings in which.

DETAILED DESCRIPTION

Figure 1:
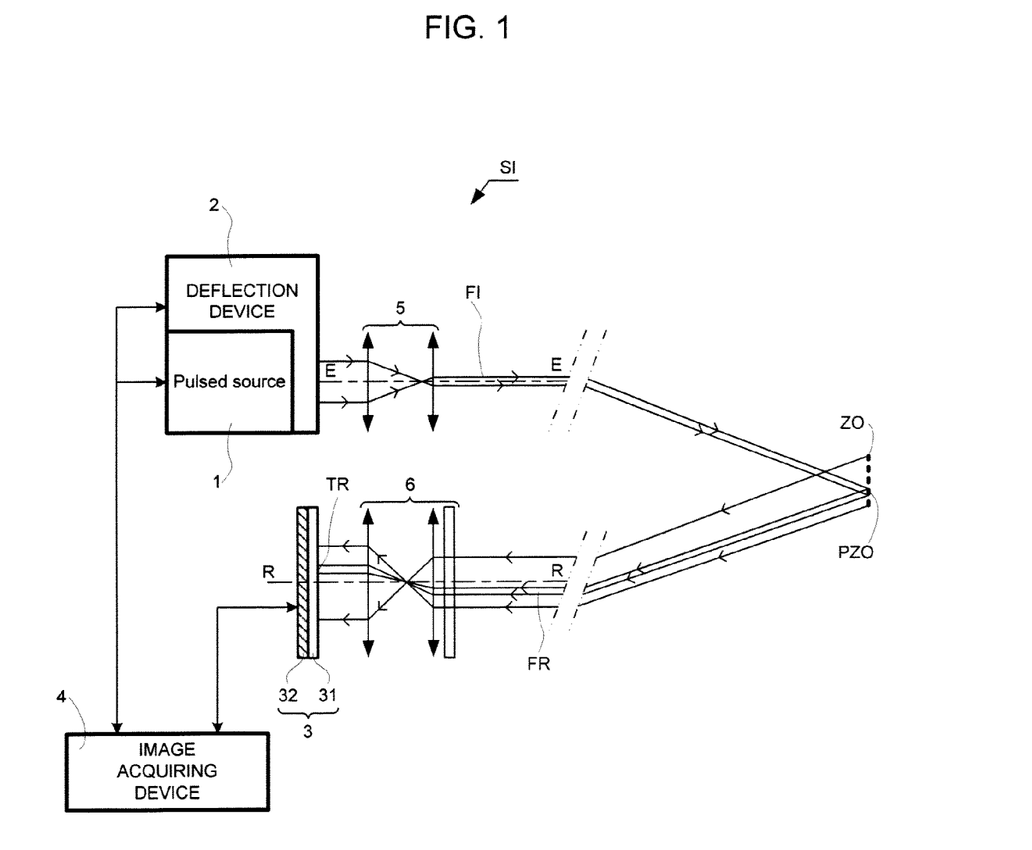
FIG. 1 is a schematic block diagram of an imaging system according to the present method, system and device, illuminating an observed area portion.
Figure 2:
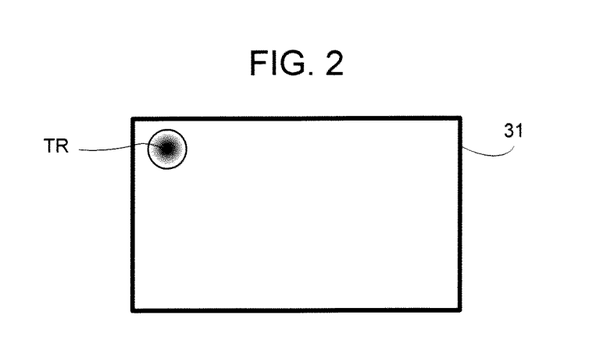
FIGS. 2, 3, 4 and 5 are front views of the photosensitive surface area of an optronic sensor in the imaging system respectively when it receives a backscatter spot, it transmits a small-sized image to be processed, it successively receives backscatter spots line by line, or column by column, and it transmits small-sized images to be processed line by line, or column by column.
Figure 3:
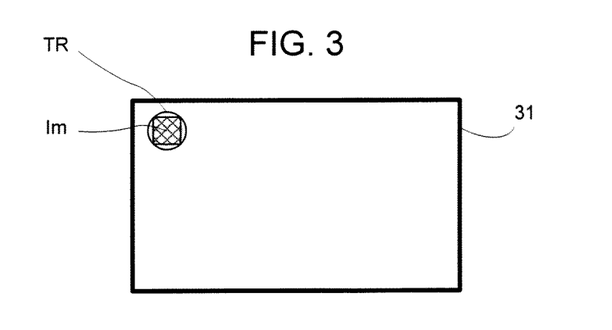

With reference to FIG. 1, an active imaging system SI according to a first embodiment of the present method, system and device includes a pulsed light source 1 of an incident beam FI oriented towards a portion PZO of an observed area ZO, a programmable device 2 for deflecting the incident beam, an optronic sensor 3 oriented towards the observed area and an image acquiring device 4. The imaging system is for example stationary on the ground, or embedded on board a vehicle or an earth, air or sea device. The substantially circular portion PZO of the observed area is illuminated by the incident beam FI emitted by the source 1 for example through a beam deflecting means in the device 2 and a focalizing optics 5. The sensor 3 has a photosensitive side of photodetectors 31 positioned substantially on the focal plane of a filtering and focalizing optics 6 through which the sensor has a view field substantially covering the observed area ZO. The photosensitive side 31 and the observed area are thereby substantially conjugated by the optics 6. A portion of the photosensitive surface area of the optronic sensor, i.e. a part of the photodetectors making up the optronic sensor, is only activated by a beam FR issued from the backscatter of the incident beam FI on the illuminated portion PZO of the observed area.

On FIG. 1, the imaging system SI is bistatic with an optical emission axis EE between the light source 1 and the observed area ZO and an optical reception axis RR between the observed area and the optronic sensor, that are substantially parallel as the distance between the imaging system and the observed area is large compared to the dimensions of the system. However, practically, the optical axes converge to the observed area. Their convergence can be set at the factory or before each use of the imaging system. Alternatively, the imaging system is monostatic with optical axes that are combined into a common optical axis through a beam separator.

The pulsed source 1 of the incident beam FI has a high power with a high frequency of the emissions of the incident beam. It can be a solid-state laser such as a fiber laser or a diode laser, or a light emitting diode, having an emission wavelength ranging in the near-infrared, between about 0.7 µm and about 3 µm. More generally, it can, depending on the conditions of use of the imaging system, have a wavelength in the ultraviolet, visible, near-infrared or terahertz, optionally infrared ranges. The incident beam FI does not illuminate the whole observed area ZO at each pulse. The emission power of the source is concentrated at each pulse on a variable small portion PZO of the observed area so that the ratio of the backscattered signal received by the sensor 3 on the noise is sufficiently high for acquiring an image with a desired high spatial resolution.

Figure 4:
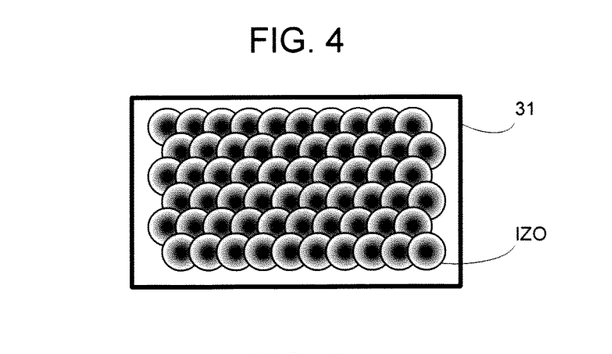
Figure 5:
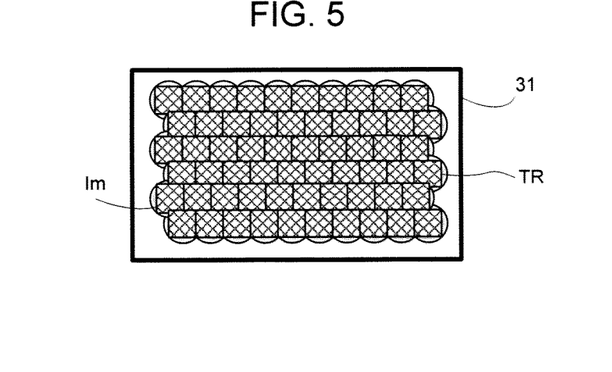

The deflection device 2 periodically controls a deflection of the incident light beam FI to a circular portion PZO of the observed area ZO. For example. as shown on FIG. 4, if the observed area of interest corresponds to an image with a rectangular surface somewhat lower than the photosensitive surface area of the photodetectors 31 of the sensor 3, the incident beam is deflected step by step line by line, for example from the left to the right and up and down. The pitch of the deflection is synchronous with the periodicity of the emission control pulses of the incident beam in the source 1 and therefore of shots of the incident beam. The deflecting means in the device 2 includes in outlet of the incident beam FI from the source 1 for example two rotating mirrors or prisms or an acousto-optic deflector for deflecting the incident beam FI towards a variable targeted portion PZO of the observed area.

The optronic sensor 3 includes photodetectors 31 on the photosensitive front side and a reading circuit 32 on the rear side. The photodetectors are for example arranged as a square or rectangular matrix according to the embodiment illustrated on FIGS. 2 to 5. For example, a photodetector is a photodiode generating a current when exposed to an infrared radiation. The reading circuit linked to this photodetector is activated by an integration pulse of a control signal provided by the image acquiring device 4. During the integration pulse, as during the aperture of a diaphragm, an electric accumulator such as a capacitor in the reading circuit accumulates an electrical charge. The generated current more specifically depends on the intensity and on the wavelength of the radiation and on the exposure duration controlled by the width of the integration pulse generated by the image acquiring device 4. During the progressive acquisition of the complete image of the observed area, small-sized image by small-sized image as will be seen later on, all the accumulators in the reading circuit 32 are discharged and only the accumulators associated with photodetectors of the portion of the photosensitive surface area of the optronic sensor 3 receiving a backscatter spot TR are addressed at the end of the corresponding integration pulse, in response to a pulse of the incident beam. The charges accumulated in the addressed accumulators are only read and integrated at the end of the integration pulse and thus after the end of the exposure to the received backscatter spot to make up a small-sized image to be stored in the image acquiring device 4. Each small-sized image is preferably read following its illumination.

Typically, the imaging system SI according to the present method, system and device has so high a spatial resolution that a portion PZO of the observed area illuminated by the incident light beam FI. of the order of a few tens of centimeters to a few meters of diameter according to the power of the source 1 and the range, corresponds to a spot of the backscattered beam TR of the order of a few tens to a few hundreds of photodetectors on the photosensitive surface area of the sensor 3. In the remainder of the description, the backscatter spot TR corresponding to the portion PZO illuminated by the incident beam FI is considered, for example, as a substantially circular small-sized image on the photosensitive surface area of the sensor, as shown on FIG. 2. The image actually acquired by the image acquiring device 4 is represented by a "small-sized image" Im ideally substantially concentric with and substantially covers the circular backscatter spot TR, as shown on FIG. 3. The small-sized image can have a polygonal, circular or elliptic outline. Generally, the outline of the small-sized image is similar to that of the photosensitive surface area 31 of the sensor and is for example rectangular, square or hexagonal for a rectangular sensor including a matrix of photodetectors, as shown on FIGS. 2 to 5. Typically, the small-sized image is defined by a photosensitive surface area of 10×10 to 30×30 photosensitive elements, referred to as pixels, made up by photodetectors of the sensor. The circular spot TR of the backscattered beam is nearly completely covered by the small-sized image Im so as to recover a larger light energy from the backscattered beam, to facilitate the alignments and to omit possible instabilities or plotting inaccuracies of the emitted pulses. For example, the cover is at least about 60%. At a minimum, a backscatter spot TR covers a few pixels, for example at least two pixels, and a small-sized image Im covers at least four pixels amongst the set of the pixels of the matrix. In a preferred embodiment, the adjacent small-sized images partially overlap two to two to facilitate the alignments. Ideally, pixels of several lines, or of several columns, are common to two adjacent small-sized images.

In the image acquiring device 4 according to the first embodiment, a circuit for controlling the reading circuit 32 of the optronic sensor provides integration pulses, the integration duration TII of which covers the reception duration of the flash made up by a pulse of the backscattered beam FR without covering the propagation time of a pulse of the incident beam between the source 1 and the observed area ZO. Such conditions prevents the sensor 3 from sensing interference images resulting from the partial backscatter of the incident beam FI by obstacles including side ones, located between the source 1 and the observed area ZO. while providing an optimum recovery of the energy of the beam FR backscattered by a portion PZO of the observed area. For example, the obstacles are diffusing particles or branches of a tree in front of an observed scene. As shown on FIG. 6, the integration pulses are synchronous with the emission control pulses IFI of the incident beam FI. The width TL-RS of the integration pulses lies between a reset time RS and a reading time TL at each period of emission. The reset time RS at the start of the integration pulse precedes the reception of the pulse IFR of the backscattered beam and corresponds to a reset of the charge of accumulators in the reading circuit 32 of the sensor 3. The reading time TL at the end of the integration pulse follows the reception of the pulse IFR of the backscattered beam and corresponds to a reading of the charges of accumulators of the reading circuit associated with a small-sized image corresponding to the received backscatter spot TR. The duration of the integration pulse is adjustable and depends on the desired field depth. Periodically between the emissions of two pulses IFI of the incident beam FI, all the photodetectors and all the accumulators in the sensor 3 are inactive for a duration TIN, as during the closure of a diaphragm, including at least scattering a pulse of the incident beam between the source 1 and the observed area ZO.

Alternatively, only a part of said photodetectors, including at the minimum the photodetectors coinciding with the small-sized image that will be read, is made inactive for a duration time TIN. Successive small-sized images can optionally be acquired synchronously, with some degree of time interlacing, i.e. with a reading of a small-sized image after the emission of a pulse of the incident beam corresponding to a next small-sized image, and optionally with inactivity durations TIN distinct from one small-sized image to the next one, more particularly when such small-sized images are relatively remote from each other on the sensor 3. Such small-sized images can help to image distinct areas of an observed scene and/or distinct objects of the scene.

At each shot of the incident beam FI, the image acquiring device 4 acquires and stores a small-sized image Im corresponding to a backscatter spot TR. When at the most the whole observed area ZO has been scanned by the incident beam FI successively illuminating portions PZO of the observed area ZO covered by the view field of the sensor 3, the sensor has received a large number of backscatter spots TR overlapping at the edge two to two, as shown on FIG. 4. The device 4 has acquired on the received spots a large number of small-sized images Im partially superimposed at the edge on each other and making up, after processing, a final image of the observed area, as shown on FIG. 5. The system SI thereby has a very extended detection field compared to the instantaneous diameter of the backscatter light spot TR. Each image and its attributes, with or without pre-processing, can be read and presented automatically to a decision system, or on a display of the device 4, to an operator. The decision system can be merely automatic or include an operator in the loop.

Considering in this first embodiment that the view field of the sensor 3 remains oriented stationary in the direction of the observed area ZO, or considering that the system SI tracks a target with a tracking means having a maximum reaction frequency substantially lower than the frequency of the pulses of the incident beam FI, the image acquiring device 4 considers that the small-sized images Im are consecutively received in a stationary reference frame. As shown on FIG. 5, the small-sized images Im overlap partially the ones on the others at least two to two to ensure some continuity of the final image of the observed area during the acquisition duration of all the small-sized images making up the final image. Alternatively, the small-sized images may not overlap each other, more particularly if the required number of small-sized images for imaging the observation area is reduced, particularly if the image distortions able to be induced by motions of the objects to be observed and/or the carrier of the system SI during the acquisition duration of the image remain insignificant. The acquisition duration of the final image is substantially equal to the product of the number of the backscatter spots being received or small-sized images by the period TFI of pulses IFI of the incident beam. The stationary reference frame imparts a geometric self-referencing of consecutive small-sized images with respect to each other on a number of small images, for example by fractioning lines of the final image, and thereby prevents a geometric alignment for this number of small-sized images. More precisely, the geometric alignment of two small-sized images processed in the image acquiring device 4 corresponds to a "radiometric" offset depending on the level of the signal received by the optronic sensor 3 and on the quality of the electric signal delivered by the sensor and resulting from the opposed gradients of Gaussian light intensities in the periphery of two consecutive overlapping backscatter spots and thus of overlapping edges of two adjacent small-sized images. For example, the image acquiring device substantially averages the peripheral light intensities in the overlapping parts, or relies on known alignments for video images based on similarities and smoothing interpolations and/or artifacts in the superimposed edges of two adjacent small-sized images. The partial overlap between small-sized images improves the effective signal-to-noise ratio at the edge of the portion of the illuminated observed area PZO and enables to put a little further apart the centroids of the incident light beams successively emitted in the angular field. It results therefrom the possibility to substantially increase the dimension of each small-sized image. The stationary reference frame helps to gain stability in the line of sight and enables to scan very quickly the observed area by the pulses of the incident beam to address, as desired, any area of the view field.

It results from the foregoing that the geometric alignments between two consecutive small-sized images are in principle useless as the frequency of the pulses of the incident beam and of the acquisition of small-sized images is high. However, at least alignments between two consecutive lines or columns of small-sized images are processed routinely in the image acquiring device 4 so as to limit image distortions.

Figure 7:
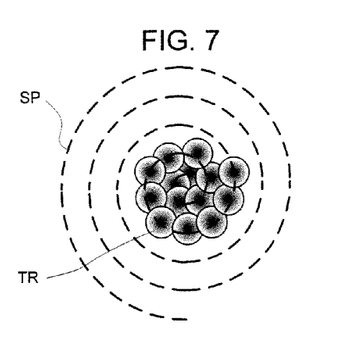
FIG. 7 shows backscattered beam spots received following a spiral on the photosensitive surface area of the optronic sensor.

According to another embodiment shown on FIG. 7, the deflection device 2 controls in the source 1 an emission of pulses of the incident beam IFI deflected according to a scan following a substantially spiral shaped illumination on the observed area ZO, and backscattered into corresponding spots TR partially overlapping two to two and substantially following a spiral SP on the photosensitive surface area 31, preferably starting from the centre of the spiral SP and ending with the periphery of the latter. Reading successive small-sized images corresponding to the backscatter spots overlapping as a spiral results in an excellent quality of the final image particularly in the centre thereof. Any fuzziness resulting from the mobility of an object substantially centered on the spiral followed by the incident beam on the observed area is attenuated by the acquisition of small-sized images following the spiral. For example, a ten of small-sized images in the centre of the spiral allows the image acquiring device 4 to acquire the image of the object. The small-sized images on the periphery acquired after the central small-sized images of the spiral SP substantially centered on the image of the object can require a lower signal-to-noise ratio; in this respect, the backscatter spots and the corresponding small-sized images can less overlap, the peripheral small-sized images only reflecting the context of the object.

Alternatively, only the small-sized images in a central region of the spiral SP including the image of the object are refreshed with a high frequency of pulses of the incident beam, and the peripheral small-sized images of the spiral SP are only refreshed in a stand-by mode with a much lower frequency of pulses of the incident beam than the acquisition frequency of the small-sized images in the central region. The pitch between two consecutive small-sized images can progressively or step by step increase towards the periphery, for example, outside the first two or the first three central turns of the spiral.

According to another alternative embodiment aimed at reducing the number of small-sized images particularly around the image of an object, the dimensions of small-sized images are progressively or step by step increased from a central area containing a few turns towards the periphery of the spiral, without increasing the section of the incident beam and thus the backscatter spots, but merely spacing their centroids apart.

According to still another alternative embodiment, the section of the incident beam is progressively or step by step increased from a central area containing a few turns towards the periphery of the spiral, while increasing the sizes of the corresponding small-sized images in similar proportions.

According to another more complete alternative embodiment, two or more of the previous alternative embodiments relating to the spiral SP are combined.

According to another alternative embodiment, the section of the incident beam and the spacing between the centroids of the small-sized images can together or separately be decreasing functions for the desired signal-to-noise ratio, the distance to the object, or the energy density per surface unit and per pulse necessary for achieving a desired signal-to-noise ratio, so as to adapt the compromise between the signal-to-noise ratio and the illuminated useful field as a function of the observation conditions and operational needs. Such dynamic settings can be accompanied with an adaptation of the density of the emitted light power, even the total emitted light power, leading to an optimization of the energy consumption of the imaging system, of the stealthiness and the risks linked to the exposure to the light radiation.

The deflection device 2 can be programmed by an operator for scanning the observed area ZO, or one or more interesting parts of the observed area according to a dynamically configured scanning so as to improve the signal-to-noise ratio and/or the range on an observed predetermined part, temporarily or in a more extended way. The read illuminated field is thereby dynamically adaptable both as in plotting of the incident beam and in beam section, in energy per pulse or in scanning to a part of the observed area. This allows the various parameters of the imaging system to be set as a function of the range, of the atmospheric or sub-marine conditions, of the dimensions and shapes and characteristics including the reflectance of a part of the observed area, for example including an object of interest.

These various adaptations give the opportunity to acquire the image of a particular object or the images of several particular objects located in the observed area ZO, even when the light power remains insufficient so that the whole view field is able to be illuminated. According to the example shown on FIG. 8, the images IOB1 and IOB2 of two distinct objects included in the observed area are only acquired by the device 4, for example by illumination of consecutive pulses of the incident beam FI from an object to the other, or of a series of pulses respectively for the objects, with no illumination of parts of the observed area located between these objects, or through selective reading of the charges of the photodetectors in the sensor 3 only associated with the small-sized images corresponding to the objects. The acquisitions of images of objects are independent from each other, i.e. the objects can be illuminated at different angular and/or depth distances and their images are acquired at distinct reading times.

In an alternative embodiment. the matrix of photodetectors can be distributed into sectors, for example in halves or in quarters, with their electronic addressings in polarization and reading independent. The electronic control assembly of the imaging system is adapted so that the information recorded by one of the sectors of the matrix of photodetectors is transmitted wholly independently after, or in an asynchronous way to, the reception of a subsequent backscatter. spot corresponding to another sector.

Alternatively, the deflection device 2 continuously controls the deflection of the incident light beam FL without modifying the control of the charge and discharge of the accumulators by the integration pulses.

According to another alternative embodiment, the deflection device 2 periodically controls the deflection of the incident beam FI sometimes by one pitch, sometimes continuously. For example, the deflection device 2 is stable during at least the emission of a pulse of the incident beam FI and is ready for deflecting the incident beam during the remainder of the period. The operating adjustment of the deflection device can depend on operational and environmental conditions of the observed area.

Thanks to the presence of a deflection device 2 deflecting pulses of the incident beam FI, and within the limits of the performance thereof. the mechanical harmonization of the emission and reception paths does not require any accuracy to the pixel or the sub-pixel, even in the case of small-sized images limited to a few pixels. Indeed, the present method, system and device enable to achieve an automatic software harmonization or as the case may be semi-automatic software harmonization, during a mission. In a preferred embodiment, one algorithm controls more specifically the deflection device and calculates the positions of the centroids of the backscatter spots being actually formed on the photosensitive surface area of the optronic sensor 3. This algorithm adjusts the control signal of the deflection device 2 to re-center subsequent backscatter spots on the corresponding small-sized images. Conversely, the algorithm controls more specifically the image acquiring device 4 and re-centers subsequent small-sized images on the corresponding backscatter spots. Such adjustments can be achieved before and/or periodically while the imaging system is used, typically once each time the system is started, but optionally each time the data is refreshed if the use features of system justify this.

Figure 9:
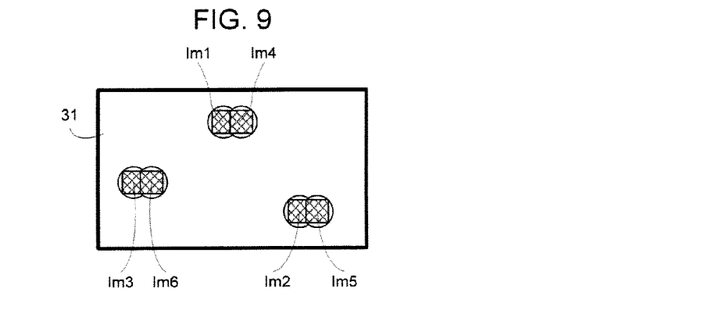
FIG. 9 is a front view of the photosensitive surface area having received images of three objects located in the observed area by cycle of three successive backscatter spots.

According to still another embodiment which can be combined with the previous alternative embodiments, the acquisition of interference images produced by the backscatter on diffuse or dense obstacles located between the source 1 and each object of interest can be omitted when the deflection device 2 controls consecutive incident-beam emissions on portions of the observed area ZO that are not two to two contiguous. For example, as shown on FIG. 9. small-sized images Im1, Im2, Im3, Im4, Im5 and Im6 successively processed in such sequence correspond to three pairs of distinct and well separated portions on the observation area ZO and to backscatter spots TR respectively arranged at three distinct and well separated locations on the photosensitive surface area 31 of the sensor 3 and resulting from the emission of six consecutive pulses of the incident beam. The small-sized images Im1 and Im4, Im2 and Im5, and Im3 and Im6 make up respectively the images for example of three objects of interest.

Figure 6:
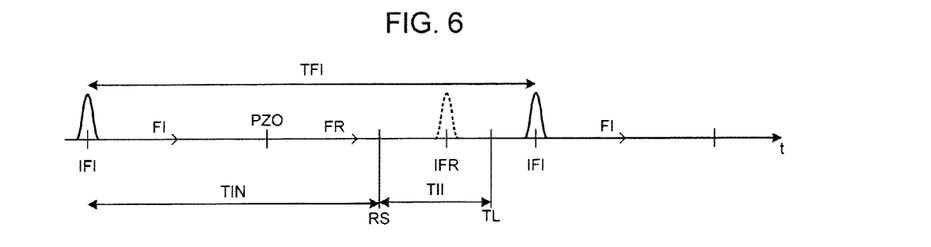
FIG. 6 is a time diagram of incident beam and backscattered beam pulses according to a first embodiment of the present method, system and device.
Figure 10:
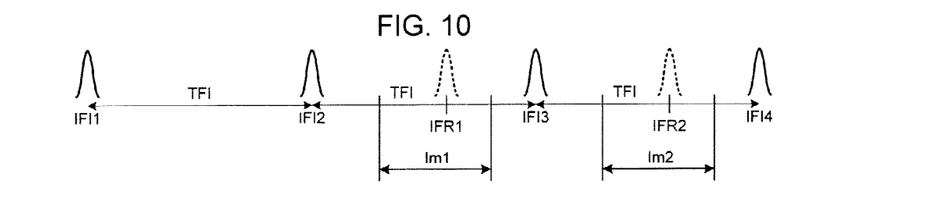
FIG. 10 is a time diagram of incident beam and backscattered beam pulses according to a second embodiment of the present method, system and device.

Comparatively to FIG. 6 according to which a second pulse of the incident beam IFI follows an integration pulse with a duration TTI so as to accumulate charges of the backscatter spot corresponding to a first previous pulse of the incident beam, the period TFI of pulses of the incident beam FI according to the second embodiment can advantageously be shorter. as shown on FIG. 10. On this figure, it has been assumed that the period of pulses of the incident beam was equal to the half-period of pulses of the incident beam according to FIG. 6. For example, the small-sized image Im2 from a backscatter spot resulting from the emission of a second incident beam pulse IFI2 follows, and does not precede, the emission of a third incident beam pulse IFI3 following the pulse IF12. The width TII of an integration pulse lies between the emissions of two successive pulses of the incident beam without taking care that a part of the integration pulse interferes during the scatter of a pulse between the source 1 and the observed area ZO.

Figure 8:
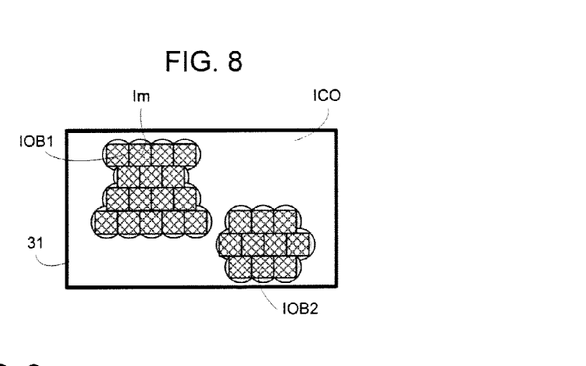
FIG. 8 is a front view of the photosensitive surface area having received images of two objects located in the area observed by the system.

In the case of several objects, for example two objects with reference to FIG. 8. a small-sized image of the image of the object IOB1 is first acquired, then a small-sized image of the image of the object IOB2 is acquired afterwards and so on alternately from one image to the other. More generally, the photosensitive surface area of the sensor 3 is divided into several parts gathering small-sized images in numbers different at first sight, the small-sized images being read one after the other in terms of one small-sized image per part during a reading cycle of the final image. When the image of an object contains numerous small-sized images, such as the image IOB1, for example a small-sized image of a line is read, then a small-sized image in a line not consecutive to the previous one is read, and so on.

The scanning frequencies of sub-areas included in the observed area ZO and thus the reading frequencies of photosensitive parts of the sensor 3 can be different as a function of the interest of the sub-areas and of the mobility of objects contained in the sub-areas. For example on FIG. 8, the object image IOB1 containing a stationary object with respect to the whole view field of the imaging system is only refreshed every three refreshes of the object image IOB2 containing a mobile object with respect to said view field, and the remaining image ICO relating to the context surrounding the objects having the images IOB1 and IOB2 is only refreshed every 10 refreshes of the object image IOB2. The image IOB2 containing the mobile object within the whole view field of the imaging system is tracked by the deflection device 2 under the control of the image acquiring device 4 for example tracking the barycenter of the mobile object or a "hot" point of high light intensity of the mobile object. The emission power of the source 1 is thereby better distributed on the most interesting sub-areas.

Thus, the detection matrix can track a stationary object or slave its line of sight on predetermined coordinates of a ground point and also image, tracking them in the view field of the system, mobile objects being present in the observed area ZO.

More generally, the detection matrix can track a reference point corresponding to a stationary or mobile reference object, to geographical coordinates or to a fictive trajectory. The observed area ZO can thereby move continuously or sequentially in time, the imaging system being able to be itself in motion. One or more objects of interest, whether in relative motion or not with respect to the point being tracked, can be imaged. As a function of operational needs that can progress in time, one or more of such objects of interest can take advantage of a more frequent image refresh than the other objects of interest present in the observed area and/or a track within the total view field of the active imaging system. The optional reference object, more generally the stationary or mobile reference point, can, according to the needs, not be itself imaged by the active imaging system. The track can then be slaved on coordinates or on a trajectory provided by a higher level system, for example, on a passive imaging path or on a radar path of a higher level system.

According to another alternative embodiment, the energy emitted by a pulse of the incident beam FI is variable. For example, small-sized images in a central area of the spiral SP shown on FIG. 7 are captured further to an incident beam having an emission power high than that of the incident beam used for capturing small-sized images on the periphery of the spiral.

The imaging system SI can operate both during the day as during the night. It can operate in a standby passive mode when the pulsed source of the incident beam 1 is not activated and the observed area ZO is illuminated by the natural light or a source of artificial light for which the sensor 3 is photosensitive. Thus, in the imaging system, the captured image can result at least partially from a passive mode operation. The pulsed source of the incident beam 1 generating the illumination typical of the system is only activated if conditions require so and the activation of the source can be limited to sub-areas of the observed area ZO with an insufficient signal-to-noise ratio. With reference to FIG. 8. the context image ICO can be captured in a standby passive mode, whereas the object images IOB1. IOB2 can be captured in an active mode with a scan of the incident beam according to the present method, system and device.

It seems from the various previous embodiments and their alternatives that the imaging system according to the present disclosure provides a larger eye safety while ensuring a higher stealthiness by means of a reduction of the emission power of the incident beam, compared to the prior art imaging systems.

The present disclosure relates to an imaging method and an imaging system. According to an implementation. the steps of the method of the present disclosure are determined by the instructions from a computer program incorporated into the system. The program includes instructions which carry out the steps of the method according to the present disclosure when said program is executed in a processor of the system the operation, whose operation is then controlled by the execution of the program.

Consequently, the present method, system and device also apply to a computer program, in particular a computer program stored on or in a storage medium readable by a computer and by any data processing device adapted to implement the present method, system and device. This program can use any programming language and take the form of source code, object code or an intermediate code between source code and object code, such as a partially compiled form, or any other form desirable for implementing the method according to the present disclosure.

The storage medium can be any entity or device capable of storing the program.

The invention claimed is:

1. An imaging method wherein pulses of an incident beam are emitted by a pulsed light source towards an observed area covered substantially by the view field of a photosensitive surface area of an optronic sensor, the method comprising:
for each pulse of said incident beam, deflecting said pulse towards a respective portion of said observed area;
backscattering said pulse by said respective portion of said observed area to form a respective backscatter spot on said photosensitive surface area;
integrating charges accumulated in a portion of said photosensitive surface area exposed to said respective backscatter spot during at least a reception duration of said respective backscatter spot by said sensor, an integration duration lying between emissions of two successive pulses of said incident beam;
acquiring a small-sized image corresponding to said respective backscatter spot resulting from the emission of said pulse as a function of said accumulated charges;
maintaining the photosensitive surface area inactive during at least said emission of said pulse between said source and said observed area; and
providing a partial overlap of backscatter spots at least two to two into overlapping backscatters, a partial overlap of small-sized images at least two to two corresponding to said overlapping backscatters into overlapping small-sized images, and a combination of at least two adjacent overlapping small-sized images.

2. The method according to claim 1, wherein two acquired small-sized images corresponding to backscatter spots are geometrically offset from each other.

3. The method according to claim 1, further providing an alignment of at least two adjacent small-sized images.

4. The method according to claim 1, further comprising emitting consecutive pulses of said incident beam towards portions of said observed area that are not contiguous to acquire small-sized images that are not contiguous on said photosensitive surface area.

5. The method according to claim 1, wherein said respective small-sized image corresponding to said respective backscatter spot resulting from the emission of said pulse is acquired between emissions of two consecutive incident beam pulses following said pulse.

6. The method according to claim 1, further comprising emitting pulses of said incident beam that are deflected towards portions of said observed area partially overlapping two to two and substantially following a spiral, and that are backscattered into respective spots partially overlapping two to two and substantially following a spiral on said photosensitive surface area.

7. The method according to claim 1, wherein small-sized images corresponding to a sub-area of said observed area are acquired with a frequency of incident beam pulses different from that for small-sized images of another sub-area of said observed area.

8. The method according to claim 1, wherein two small-sized images have different sizes.

9. The method according to claim 1, wherein a small-sized image covers a substantially larger surface than the corresponding backscatter spot.

10. The method according to claim 1, including emitting two pulses of said incident beam having different incident beam sections by said source.

11. The method according to claim 1, including emitting two pulses of said incident beam having different emission energies by said source.

12. The method according to claim 1, wherein the deflecting includes re-centering backscatter spots on small-sized images.

13. The method according to claim 1, wherein the acquiring includes re-centering small-sized images on backscatter spots.

14. An imaging system comprising a pulsed light source for emitting pulses of an incident beam oriented towards an observed area and an optronic sensor having a photosensitive surface area with a view field able to substantially cover said observed area, wherein for each pulse of said incident beam able to be only backscattered by a respective portion of said observed area to form a backscatter spot on said photosensitive surface area, the imaging system comprising:
deflection means for deflecting said pulse towards a respective portion of said observed area, integration means for integrating charges accumulated in a portion of said photosensitive surface area exposed to said respective backscatter spot during at least a reception duration of said respective backscatter spot by the sensor, an integration duration lying between emissions of two successive pulses of said incident beam;
acquisition means for acquiring a small-sized image corresponding to said respective backscatter spot resulting from the emission of said pulse as a function of said accumulated charges;
means for maintaining said photosensitive surface area inactive during at least said emission of said pulse between said source and said observed area; and
means for providing a partial overlap of backscatter spots at least two to two into overlapping backscatters, a partial overlap of small-sized images at least two to two corresponding to said overlapping backscatters into overlapping small-sized images, and a combination of at least two adjacent overlapping small-sized images.

15. The system according to claim 14, wherein said integration means is able to integrate charges accumulated in said photosensitive surface area between emissions of two consecutive pulses of said incident beam so that said acquisition means is able to acquire a small-sized image corresponding to a respective backscatter spot resulting from an emission of a pulse of said incident beam preceding said two consecutive pulses of said incident beam.

16. The system according to claim 14, wherein said light source is a fiber laser.

17. The system according to claim 14, wherein said light source has an emission wavelength ranging between about 0.7 μm and about 3 μm.

18. A computer program adapted to be implemented in an imaging system including a pulsed light source for emitting an incident beam oriented towards an observed area and an optronic sensor having a photosensitive surface area with a view field configured to substantially cover said observed area, said program comprising instructions which, when the program is executed in said imaging system, provide control for each pulse of said incident beam to:
- deflect said pulse towards a respective portion of said observed area;
- backscatter said pulse by a respective portion of said observed area to form a backscatter spot on the photosensitive surface area;
- integrate charges accumulated in a portion of said photosensitive surface area exposed to said respective backscatter spot during at least a reception duration of said respective backscatter spot by said sensor, an integration duration lying between emissions of two successive pulses of said incident beam;
- acquire a small-sized image corresponding to said respective backscatter spot resulting from the emission of said pulse as a function of said accumulated charges;
- maintain the photosensitive surface area inactive during at least said emission of said pulse between said source and said observed area; and
- provide a partial overlap of backscatter spots at least two to two into overlapping backscatters, a partial overlap of small-sized images at least two to two corresponding to said overlapping backscatters into overlapping small-sized images, and a combination of at least two adjacent overlapping small-sized images.

19. An imaging method wherein pulses of an incident beam are emitted by a pulsed light source towards an observed area covered substantially by the view field of a photosensitive surface area of an optronic sensor, the method comprising:
- for each pulse of said incident beam, deflecting said pulse towards a respective portion of said observed area;
- backscattering said pulse by said respective portion of said observed area to form a respective backscatter spot on said photosensitive surface area;
- integrating charges accumulated in a portion of said photosensitive surface area exposed to said respective backscatter spot during at least a reception duration of said respective backscatter spot by said sensor into accumulated charges, said reception duration lying between emissions of two successive pulses of said incident beam;
- acquiring a small-sized image corresponding to said respective backscatter spot resulting from the emission of said pulse as a function of said accumulated charges;
- maintaining the photosensitive surface area inactive during at least said emission of said pulse between said source and said observed area; and
- providing an alignment of at least two adjacent small-sized images.

20. An imaging method wherein pulses of an incident beam are emitted by a pulsed light source towards an observed area covered substantially by the view field of a photosensitive surface area of an optronic sensor, the method comprising:
- for each pulse of said incident beam, deflecting said pulse towards a respective portion of said observed area;
- backscattering said pulse by said respective portion of said observed area to form a respective backscatter spot on said photosensitive surface area;
- integrating charges accumulated in a portion of said photosensitive surface area exposed to said respective backscatter spot during at least a reception duration of said respective backscatter spot by said sensor into accumulated charges, said reception duration lying between emissions of two successive pulses of said incident beam;
- acquiring a small-sized image corresponding to said respective backscatter spot resulting from the emission of said pulse as a function of said accumulated charges;
- maintaining the photosensitive surface area inactive during at least said emission of said pulse between said source and said observed area; and
- wherein two small-sized images have different sizes.

* * * * *